April 29, 1952     H. J. MILLER     2,594,476

GARDEN AND INSECTICIDE SPRAYER

Filed April 26, 1949

Inventor

HENRY J. MILLER.

By *Howard J. Whelan.*

Attorney

Patented Apr. 29, 1952

2,594,476

UNITED STATES PATENT OFFICE 2,594,476

GARDEN AND INSECTICIDE SPRAYER

Henry J. Miller, Baltimore, Md.

Application April 26, 1949, Serial No. 89,649

3 Claims. (Cl. 299—83)

This invention relates to spraying equipment and more particularly to hose nozzles and those arranged for mixing ingredients at the instant of spraying.

The conventional sprayer is of the tank pressure type wherein the materials to be sprayed are placed in the tank and an air pressure of between 20 to 40 pounds is maintained to place the ingredients on the vegetation and the like.

The tank sprayer at times emits a concentrated solution which burns the vegetation due to lack of water. It was also found necessary to carry the tank sprayer up into trees to spray them.

The conventional hose of the garden type is primarily intended to spray water on a lawn and for other watering purposes, and there its function is limited. In this invention it is the principal object to not only spray the water from a hose but also to mix ingredients and water in predetermined portions so they can be used as insecticides for poisoning insects on plants, introducing fertilizer and other ingredients suitable for gardening or agriculture.

Another object of the invention is to provide a new and improved nozzle for a hose that will provide for automatically mixing of ingredients with water used in the hose, with a control attached that will permit adjustment of the supply of ingredients.

A further object of this invention is to provide a new and improved nozzle having an adjustable arrangement for control of the mixing of ingredients therein that can be readily cleaned and repaired.

A further object of the invention is to provide a spraying combination for attachment to a garden hose to utilize the water pressure for mixing with an ingredient and delivering the mixed solution to heights varying with the pressure of the water used.

It is further an object of this invention to provide a self-cleaning and mixing sprayer of the fan diffuser type for producing a diffused stream of mixed solution.

Other objects will become apparent as the invention is more fully set forth.

For a better understanding of the invention, its objects and principles, reference is made to the drawings, which indicate a particular form of the invention by way of example. These drawings in conjunction with the following description outline the invention, while the claims emphasize the scope of the invention.

In the drawings.

Similar reference characters refer to the same parts throughout the drawings.

Figure 1:
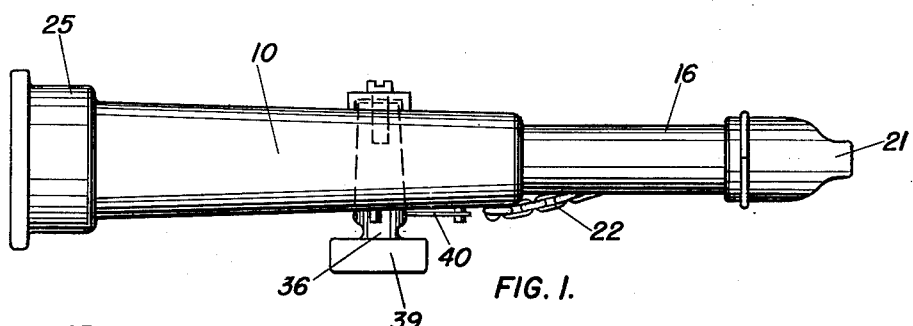
Figure 1 is a plan view of the spraying device, embodying this invention.
Figure 2:
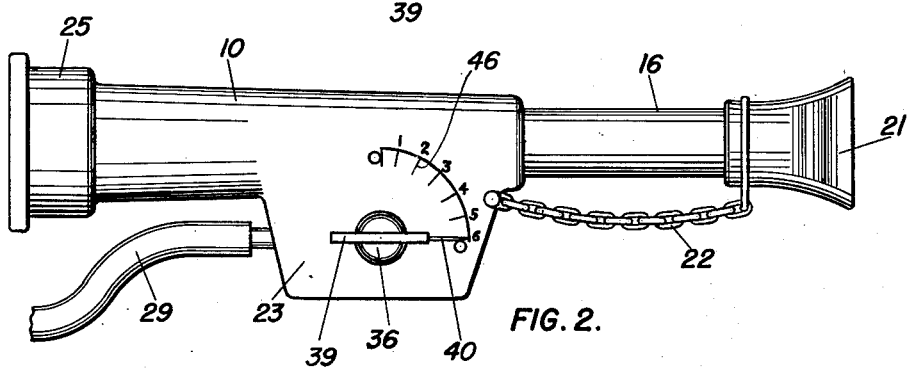
Figure 2 is a side elevation of Figure 1.
Figure 3:
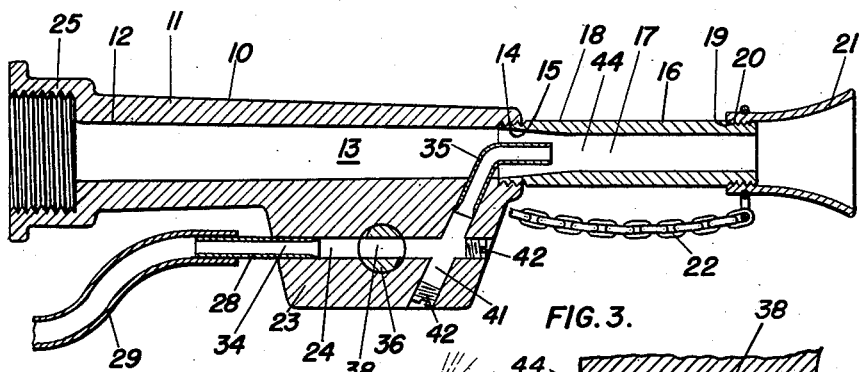
Figure 3 is a sectional view taken on line 3—3 of Figure 1.
Figures 4, 5:
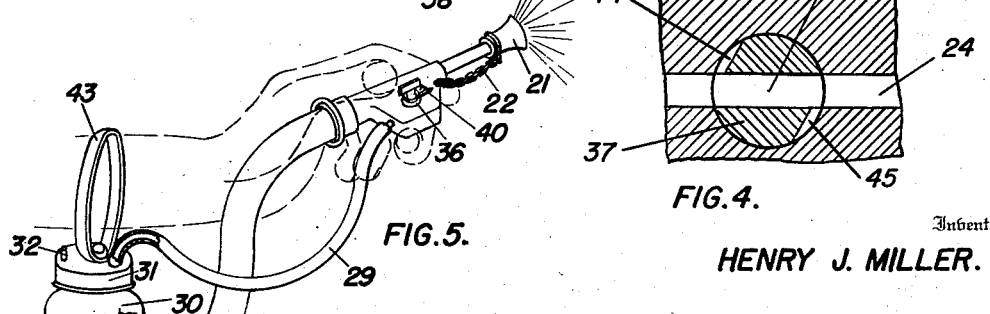
Figure 4 is an enlarged view of the stem and notched port.
Figure 5 is a view of the spray unit and bottle positioned in the hands and arm of the user.

In the drawings, a nozzle 10 has a hollow body 11 provided with a passage tapered at its incoming end 12 and continuing with a straight bore 13 to a point where it is threaded at 14, to receive the threaded portion 15 formed on one end of the tube 16. The tube 16 is provided with a passage 17 passing therethrough, with its inner face 18 tapered as shown in the drawings. The outer end of the tube 16 is threaded at 19 to receive the threaded portion 20 of the flared diffuser 21 that permits the stream from the nozzle to have the form of a fan and on the removal of the flared diffuser to return to its straight flowing stream of full capacity. The flared diffuser is preferably attached to a chain 22 and anchored to the body 11. The body 11 is surmounted by an integral housing 23 which has a chamber 24 within it of sufficient size to contain the ingredients drawn up into it that are to be mixed with the stream of water that flows through the nozzle. The water is supplied to the nozzle body 10 through a connection 25 formed at its rear to which a hose 26 is attached and supplies the water from a suitable system in the vicinity. The ingredients 27 are supplied through a connection 28 projecting from the housing 23. The connection 28 is connected to a flexible tubing 29 coming from a bottle 30 of suitable form and material having a screw cap 31 and vent 32. This bottle holds the ingredients, preferably in concentrated form and a sucker tube 33 extends down so as to provide for the removal of the ingredients eventually. The chamber 24 has its inlet 34 for the ingredients to pass from the tubing 29 into it, and the outlet jet tube 35 from which it passes to the passage 17, under the ejection suction action of the water passing through the tapered face 18. The suction of the outlet jet tube 35 is varied adjustably in its opening by a rotatable valve 36 transversely arranged in the housing 23 and consisting of a stem 37 with a port hole 38 in it aligned with the chamber 24. The amount of rotation of the stem controls the amount of ingredients 27 ejected from jet tube 35 in proportion to the opening of the port hole 38.

The stem 37 has a wing nut handle 39 to permit its manual adjustment exterior to the housing 23. Also mounted on the stem is a pointer 40 that aligns with various numerals "0, 1, 2, 3, 4, 5 and 6" engraved on the outside of the housing, as it is rotated. These numerals are located to indicate the amount of opening provided for the jet tube 35, so the operator will know what the proportions taking place in the mixing chamber are, by visually examining it. The adjustment may be made whether the water is turned on or not. The chamber 24 has a passage 41 passing angularly to it from the lower side of the housing 23 and extending in line with the outlet jet tube 35. This passage 41 enables the chamber to be cleaned out from time to time, as access is provided into it when the plugs 42 are taken out. The bottle 30 is preferably attached to the wrist by straps 43 to enable the user to carry it conveniently on his arm. The ingredients are drawn through the jet tube 35 to the mixing chamber 44 by the suction of water passing through tube 16 and diffuser 21.

The concentrate is usually prepared for placement in the jar as follows. Take about 8 ounces of the spraying material such as lead arsenate and mix with sufficient water to produce a concentrated solution of approximately 10 to 12 ounces. If it is desired to place a solution on the vegetation of 2 ounces of concentrates to each gallon of water, the needle will be pointed to No. 2, and the water turned on.

The device has a number of features that make it attractive to the gardener. It permits the mixture in the nozzle to be adjusted to suit the operator at any time even while in active use. Thus if the user wants a mixture of one ounce of concentrate to the gallon of water, he adjusts the pointer to the numeral "1." If only water is desired, the user places the pointer on "0," and so on. Some plants will need a different concentration of mixture than others, and this can be taken care of, by adjusting the wing nut. It will be realized that the flow of the mixture through tube 16 may also be varied by screwing this tube in or out of the nozzle 10 through the threaded portion 15. The result of this adjustment is to vary the position of the tapered portion of the inner face at 18 with respect to the jet tube 35, thence varying the ejector action and resulting flow through tube 16. This takes but a moment, and is conveniently accomplished. It can be readily carried around and avoids the use of air pressure and other details so necessary in other types of sprayers.

The port 38 in the stem 37 is preferably notched at 44 and 45 to enable the port to be opened gradually and conform with the equally spaced graduations and numerals set out on the face of the housing 23.

When it is desired to produce droplets of the liquid simulating rain drops, for lawn sprinkling and the like, the tubing 29 is disconnected from the connection 28 and the water turned on. This causes a supply of air to be drawn through the connection 28 and form droplets of varied diameters, depending on the amount of port opening to control the amount of air passing through the device.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. A spraying device comprising a unitary casing having longitudinal parallel passages therein, the first of said passages having a continuous smooth bore therethrough and a tapered constriction therein, means for supplying water to the first of said passages and for supplying chemical ingredients to the second passage, said casing also having a channel establishing communication between said passages, a pipe protruding from said second passage into said first passage and being bent therein into alignment with said first passage and emerging in said first passage in proximity to the constriction, whereby flow through said pipe is subjected to ejector action, a rotary valve in said casing controlling the flow of chemical ingredients in the second passage, said valve having a transverse passage communicable with the second passage and opposed tapered peripheral notches communicating with said transverse passage for gradual admission and closure of the ingredients through the second passage, and means for adjusting the location of the aforesaid tapered constriction with respect to the bent pipe, whereby flow through said pipe may be varied.

2. A spraying device as set forth in claim 1, the means for supplying chemical ingredients to said second passage including a container for the chemicals, a closure for said container and a wrist strap secured to said closure.

3. A spraying device as set forth in claim 1 including a plurality of removable plugs in said casing affording access to the passages and pipe for cleaning purposes.

HENRY J. MILLER.

REFERENCES CITED

The following references are of record in the file of this patent:

UNITED STATES PATENTS

| Number | Name | Date |
|---|---|---|
| 577,362 | Ettlinger | Feb. 16, 1897 |
| 730,723 | Verschuren | June 9, 1903 |
| 2,198,998 | Honsberger | Apr. 30, 1940 |
| 2,231,782 | Thompson | Feb. 11, 1941 |
| 2,290,718 | Thompson | July 21, 1942 |
| 2,295,661 | Hunter | Sept. 15, 1942 |
| 2,316,781 | Fox | Apr. 20, 1943 |

FOREIGN PATENTS

| Number | Country | Date |
|---|---|---|
| 28,037 of 1913 | Great Britain | Dec. 5, 1913 |
| 206,721 | Great Britain | Nov. 15, 1923 |
| 4,178/31 | Australia | Sept. 23, 1932 |
| 12,217/28 | Australia | July 5, 1929 |